(12) United States Patent
Shraga et al.

(10) Patent No.: US 6,697,374 B1
(45) Date of Patent: Feb. 24, 2004

(54) OPTICAL NETWORK COMMUNICATION SYSTEM

(75) Inventors: Eyal Shraga, Kfar Saba (IL); Oren Marmur, Kiryat Ono (IL); Ilan Ron, Kfar Saba (IL); Joseph Arol, Kiryat Ono (IL)

(73) Assignee: Flexlight Networks, Kfar Saha (IL)

( * ) Notice: Subject to any disclaimer, the term of this patent is extended or adjusted under 35 U.S.C. 154(b) by 52 days.

(21) Appl. No.: 10/016,584

(22) Filed: Dec. 5, 2001

(51) Int. Cl.[7] .............................................. H04L 12/43
(52) U.S. Cl. ...................................... 370/458; 370/468
(58) Field of Search ................................ 370/294, 432, 370/442, 458, 459, 468, 470, 471, 473, 474, 498, 521

(56) References Cited

U.S. PATENT DOCUMENTS

| | | | |
|---|---|---|---|
| 5,173,899 A | | 12/1992 | Balance |
| 5,355,368 A | | 10/1994 | Dore et al. |
| 5,515,379 A | | 5/1996 | Crisler et al. |
| 5,528,592 A | | 6/1996 | Schibler et al. |
| 5,734,656 A | | 3/1998 | Prince et al. |
| 5,802,061 A | * | 9/1998 | Agarwal ..................... 370/461 |
| 5,838,687 A | | 11/1998 | Ramfelt |
| 5,872,645 A | * | 2/1999 | Proctor ....................... 359/136 |
| 5,963,350 A | * | 10/1999 | Hill ............................. 359/127 |
| 5,982,780 A | | 11/1999 | Bohm et al. |
| 6,233,261 B1 | * | 5/2001 | Mesh et al. .................... 372/32 |
| 6,504,840 B1 | * | 1/2003 | Bostrom et al. ............ 370/360 |
| 6,504,853 B1 | * | 1/2003 | Lindgren et al. ........... 370/468 |
| 6,539,007 B1 | * | 3/2003 | Reeder et al. ............... 370/337 |
| 6,546,014 B1 | * | 4/2003 | Kramer et al. ......... 370/395.41 |
| 2002/0024971 A1 | * | 2/2002 | Umayabashi ................ 370/468 |
| 2002/0173332 A1 | * | 11/2002 | Mukai et al. ................ 455/525 |
| 2003/0039211 A1 | * | 2/2003 | Hvostov et al. ............ 370/230 |

OTHER PUBLICATIONS

Alex Benik, "Passive Optical Networks and Direct Wavelength Access", The Yankee Group, Carrier Covergence Infrastructure, Report vol. 1, No. 8, Oct. 200.

Terawave Communications, A White Paper on Next Generation Passive Optical Networks, Mar. 2000.

Terawave Communications, A White Paper on The Business Case for Next Generation PONs: An Engineering and Economic Perspective, Mar. 2000.

* cited by examiner

Primary Examiner—Chi Pham
Assistant Examiner—Anh-Vu H Ly
(74) Attorney, Agent, or Firm—Blakely, Sokoloff, Taylor & Zafman

(57) ABSTRACT

A method for communication from a central point to end points by time division multiplexing of a sequence of frames divided into multiple timeslots, including receiving at the central point data for transmission to the end points, the data including at least a first quantity of first data for transmission to a first end point and a second quantity of second data for transmission to a second end point. The method further includes allocating in each of the frames a first number of timeslots to carry the first data to the first end point, and a second number of timeslots to carry the second data to the second end point, such that the first and second numbers are variable responsive to variations in the first and second quantities of the data, and transmitting the data from the central point to the end points during the allocated timeslots.

35 Claims, 7 Drawing Sheets

US 6,697,374 B1

OPTICAL NETWORK COMMUNICATION SYSTEM

FIELD OF THE INVENTION

The present invention relates generally to information transfer in a communication network, and specifically to a protocol for transmission over a passive optical network.

BACKGROUND OF THE INVENTION

A point-to-multi-point passive optical network (PON) operates as a communication system by broadcasting optical signals downstream from a central unit, herein termed an optical line termination (OLT), to optical network terminations (ONTs). The signals are transferred from the OLT to the ONTs via fibre optic cables and passive optical splitters, which comprise the physical fabric of the network. For upstream communication, each ONT must be able to transmit signals which are not interfered with by other ONTs. One of the methods known in the art for performing such upstream and downstream transmissions is by using time domain multiple access (TDMA), wherein each ONT is allocated a window when only it can transmit, and where the OLT also has windows for transmission to specific ONTs. Other methods for avoiding interference include transmitting signals at different wavelengths, using wavelength domain multiple access (WDMA). Combinations of TDMA and WDMA are also known in the art.

U.S. Pat. No. 5,173,899 to Ballance, whose disclosure is incorporated herein by reference, describes a method for communication in a passive optical network. An OLT transmits downstream TDM frames, the frames including information, a synchronization signal, and grants (to transmit upstream) to downstream ONTs. The ONTs transmit upstream TDM signals responsive to the grants and the synchronization signal.

U.S. Pat. No. 5,355,368 to Dore et al., whose disclosure is incorporated herein by reference, describes a method for allocating timeslots in a TDMA point-to-multi-point network. The network operates in a half-duplex manner, i.e., terminals of the network alternate between sending and receiving. The method reduces the "dead" time needed between adjacent downstream timeslots of an OLT, the dead time being the round-trip time of transmission between the OLT and an ONT in the network. The reduction is implemented by giving a first ONT an authorization to send while it is receiving information addressed to a second ONT.

U.S. Pat. No. 5,515,379 to Crisler et al., whose disclosure is incorporated herein by reference, describes a system for timeslot allocation within a communication system. A communication unit transmits a first packet of data requesting permission to transmit to a timeslot allocator. The packet contains either a request for allocation of a number of timeslots, or a request to transmit multiple packets of data. In either case, the allocator allocates contiguous time slots to the unit which the unit uses for transmission of its packets.

U.S. Pat. No. 5,528,592 to Schibler et al., whose disclosure is incorporated herein by reference, describes a method for route processing asynchronous transfer mode (ATM) cells. (A packet is comprised of a plurality of ATM cells.) The method consists of receiving, in a route cell buffer, cells corresponding to the beginning and end of a packet. A router determines routing information for the packet from these cells. The information includes a routing label determining an output port for the packet, and an identifier that determines switching paths connecting a packet source to a destination of the packet.

U.S. Pat. No. 5,838,687 to Ramfelt, whose disclosure is incorporated herein by reference, describes a slot reuse method in a Dynamic Synchronous Transfer Mode (DTM) segmented network. Access to slots is controlled by slot tokens, and writing to a slot may only be performed by a controller owning the corresponding token for that slot. A block token is used to represent a group of tokens in a single control message. The method consists of extending the DTM block token format to include parameters describing segments between source and destination nodes. Block token capacity is reserved only on segments between the nodes, and enables simultaneous transmissions in the same slot over disjointed segments of the network.

U.S. Pat. No. 5,982,780 to Bohm et al., whose disclosure is incorporated herein by reference, describes centralized and distributed management of communication resources in a DTM network. In the centralized version a server node is assigned tokens corresponding to time slots for unidirectional data flow on a communications link. The server, if it has available capacity, reserves and transfers tokens to other nodes on the link, according to requests from those nodes. In the distributed version the function of the server is spread amongst two or more nodes connected to the link.

SUMMARY OF THE INVENTION

It is an object of some aspects of the present invention to provide a method for transmitting signals in a communications network.

It is a further object of some aspects of the present invention to provide a method for transmitting TDM signals in a passive optical network (PON).

In a preferred embodiment of the present invention, an optical line termination (OLT) transmits optical signals downstream to a plurality of optical network terminations (ONTs). The OLT is coupled via a passive optical distribution fabric to the ONTs, so forming a PON. The OLT acts as a controller of the downstream signals, and also of signals sent upstream by the ONTs and received by the OLT. The downstream signals are sent in the form of frames having a constant period, and each downstream frame comprises a number of "timeslots." Each timeslot is a fixed number of bytes, and within each frame the OLT allocates timeslots directed to each of the ONTs in a dynamic manner. Timeslot allocation for each frame is implemented according to quantities of data to be transmitted to/from each ONT, as determined by the OLT. Most preferably, the allocation of timeslots for each downstream frame is performed at substantially the same rate as the frames are transmitted. By allocating varying numbers of timeslots to each downstream frame or to an upstream window (explained below), the OLT effectively configures each frame or window in a variable TDM manner, with variable length times for each ONT which receives data.

Upstream signals are transmitted in a TDM manner from individual ONTs in windows, the windows being transmitted according to time pointers allocated by the OLT.

Both upstream and downstream signals comprise data transmitted according to one or more services, which may individually operate according to completely different protocols. Services typically include constant bit rate services and packet based services. Preferred embodiments of the present invention transfer data regardless of the type of service the data is transmitted under.

Upstream and downstream signals are transferred between the OLT and the ONTs via channels which are mapped as a one-to-one mapping from the services. The channels and channel parameters, such as bandwidth, are allocated by an operator of the PON, either at initialization or during operation of the PON. Each channel uses timeslots which are allocated according to bandwidth requirements of the channel's service.

Data for a specific channel in a downstream frame may be distributed within the frame non-contiguously. Also, data for a specific channel in an upstream window may be distributed within the window non-contiguously. Enabling a specific channel in upstream windows and downstream frames to be arranged non-contiguously significantly enhances the flexibility and efficiency of transmission of these signals, compared to systems which do not allow non-contiguous transmission.

There is therefore provided, according to a preferred embodiment of the present invention, a method for downstream communication from a central transmission point to a plurality of receiving end points by time division multiplexing of a sequence of frames, each of which is divided into multiple timeslots, the method including:

receiving at the central transmission point data for transmission to the end points, the data including at least a first quantity of first data for transmission to a first end point among the plurality of the end points and a second quantity of second data for transmission to a second end point among the plurality of the end points, such that the first and second quantities are variable from each of the frames to the next in the sequence;

responsive to the first and second quantities, allocating in each of the frames a first number of the timeslots to carry the first data to the first end point, and a second number of the timeslots to carry the second data to the second end point, such that the first and second numbers are variable from each of the frames to the next in the sequence responsive to variations in the first and second quantities of the data; and transmitting the data from the central transmission point to the end points during the allocated timeslots.

Preferably, the central transmission point includes an optical line terminal (OLT), and the end points include optical network terminals (ONTs), wherein the OLT and ONTs are operative as transceivers in a passive optical network.

Preferably, the data includes sets of data which are conveyed via respective different industry-standard services.

Preferably, the plurality of end points includes sets of end points operative at different wavelength groups, and the data includes respective sets of data which are conveyed between the central transmission point and the respective sets of end points via the different wavelength groups.

Preferably, the data includes sets of data which are conveyed via respective different channels, wherein each channel transfers data via a service coupled to the central transmission point and at least one of the end points.

Further preferably, the method includes assigning each channel a respective bandwidth, wherein allocating the first and the second numbers of timeslots includes allocating the first and the second numbers of timeslots responsive to the bandwidth of each of the channels.

Preferably, assigning each channel the respective bandwidth includes changing the respective bandwidth to a different bandwidth responsive to a request received by the central transmission point.

Further preferably, the first and second numbers of timeslots are allocated responsive to respective first and second data parameters stored in a memory comprised in the central transmission point.

Preferably, a total of the first number and the second number of the timeslots is less than or equal to a bandwidth of each of the sequence of frames.

Further preferably, the data includes one or more further quantities of data for transmission to respective one or more further end points among the plurality of the end points, such that the one or more further quantities are variable from each of the frames to the next in the sequence, and including allocating respective one or more further numbers of timeslots to be carried respectively to the one or more further end points.

Preferably, a period of each of the sequence of frames is substantially constant.

Preferably, each of the sequence of frames includes a header including respective window parameters for each of the plurality of end points, each window parameter including a time and a size of a window of upstream data which each of the plurality of end points is permitted to transmit to the central transmission point.

Further preferably, the respective window parameters are allocated by the central transmission point so that the windows do not collide at the central transmission point.

Preferably, the data includes at least a third quantity of third data for transmission to the first end point, such that the third quantity is variable from each of the frames to the next in the sequence, and including, responsive to the third quantity, allocating in each of the frames a third number of timeslots to carry the third data to the first end point, such that the third number is variable from each of the frames to the next in the sequence, and such that the first and third number of timeslots are not contiguous.

There is further provided, according to a preferred embodiment of the present invention, apparatus for downstream communication in a passive optic network by time division multiplexing of a sequence of frames, including:

a passive optical distribution fabric which is adapted to receive and convey data;

a plurality of receiving optical network terminations (ONTs) coupled to the fabric including first and second ONTs which are adapted to receive the data from the fabric; and a central optical line terminal (OLT) coupled to the fabric which is adapted to receive the data for transmission into the network, the data including at least a first quantity of first data for transmission to the first ONT and a second quantity of second data for transmission to the second ONT, such that the first and second quantities are variable from each of the frames to the next in the sequence, to allocate in each of the frames a first number of timeslots to carry the first data to the first ONT and a second number of timeslots to carry the second data to the second ONT, such that the first and second numbers are variable from each of the frames to the next in the sequence responsive to variations in the first and second quantities of the data, and to transmit the data during the allocated timeslots.

Preferably, the data includes sets of data which are conveyed via respective different industry-standard services.

Preferably, the plurality of ONTs includes sets of ONTs operative at different wavelength groups, and the data includes respective sets of data which are conveyed between the OLT and the respective sets of ONTs via the different wavelength groups.

Further preferably, the data includes sets of data which are conveyed via respective different channels, wherein each of the channels transfers data via a service coupled to the OLT and at least one of the ONTs.

Further preferably, each of the channels is assigned a respective bandwidth, and allocating the first and the second numbers of timeslots includes allocating the first and the second numbers of timeslots responsive to the bandwidth of each of the channels.

Preferably, assigning each of the channels the respective bandwidth includes changing the respective bandwidth to a different bandwidth responsive to a request received by the OLT.

Preferably, the OLT includes a memory, and the first and second numbers of timeslots are allocated responsive to respective first and second data parameters stored in the memory.

Further preferably, a total of the first number and the second number of the timeslots is less than or equal to a bandwidth of each of the sequence of frames.

Preferably, the data includes one or more further quantities of data for transmission to respective one or more further ONTs among the plurality of ONTs, such that the one or more further quantities are variable from each of the frames to the next in the sequence, wherein the OLT is adapted to allocate respective one or more further numbers of timeslots to be carried respectively to the one or more further ONTs.

Preferably, a period of each of the sequence of frames is substantially constant.

Preferably, each of the sequence of frames includes a header including respective window parameters for each of the plurality of ONTs, each window parameter including a time and a size of a window of upstream data which each of the plurality of ONTs is permitted to transmit to the OLT.

Preferably, the respective window parameters are allocated by the OLT so that the windows do not collide at the OLT.

Further preferably, the data includes a third quantity of third data for transmission to the first end point, such that the third quantity is variable from each of the frames to the next in the sequence, and the OLT, responsive to the third quantity, is adapted to allocate in each of the frames a third number of timeslots to carry the third data to the first end point, such that the third number is variable from each of the frames to the next in the sequence, and such that the first and third number of timeslots are not contiguous.

There is further provided, according to a preferred embodiment of the present invention, a method for communication between a transmission point of a network and an end point of the network by time division multiplexing of a sequence of frames, each of which is divided into multiple timeslots, the method including:

receiving at the transmission point data for transmission to the end point, the data including at least a first quantity of first data for transmission to the end point and a second quantity of second data for transmission to the end point, such that the first and second quantities are variable from each of the frames to the next in the sequence;

responsive to the first and second quantities, allocating in each of the frames a first number of the timeslots to carry the first data to the end point, and a second number of the timeslots to carry the second data to the end point, such that the first and second numbers are variable from each of the frames to the next in the sequence responsive to variations in the first and second quantities of the data; and transmitting the data from the transmission point to the end point during the allocated timeslots.

Preferably, the first data is conveyed via a first channel and the second data is conveyed via a second channel between the transmission point and the end point, wherein the first data is conveyed via a first service and the second data is conveyed via a second service, the first and second services being coupled to the transmission point and the end point and being external to the network.

Preferably, the data includes a third quantity of first data for transmission to the end point, such that the third quantity is variable from each of the frames to the next in the sequence, and including, responsive to the third quantity, allocating in each of the frames a third number of timeslots to carry the third quantity to the end point, such that the third number is variable from each of the frames to the next in the sequence, and such that the first and third number of timeslots are not contiguous.

There is further provided, according to a preferred embodiment of the present invention, apparatus for communication in a network by time division multiplexing of a sequence of frames, including:

a receiver coupled to the network which receives data from the network; and a transmitter coupled to the network which is adapted to receive the data for transmission into the network, the data including at least a first quantity of first data for transmission to the receiver and a second quantity of second data for transmission to the receiver, such that the first and second quantities are variable from each of the frames to the next in the sequence, to allocate in each of the frames a first number of timeslots to carry the first data to the receiver and a second number of timeslots to carry the second data to the receiver, such that the first and second numbers are variable from each of the frames to the next in the sequence responsive to variations in the first and second quantities of the data, and to transmit the data during the allocated timeslots.

Preferably, the first data is conveyed via a first channel and the second data is conveyed via a second channel between the transmitter and the receiver, wherein the first data is conveyed via a first service and the second data is conveyed via a second service, the first and second services being coupled to the transmitter and to the receiver, and being external to the network.

Preferably, the data includes a third quantity of first data for transmission to the receiver, such that the third quantity is variable from each of the frames to the next in the sequence, and including, responsive to the third quantity, allocating in each of the frames a third number of timeslots to carry the third quantity to the receiver, such that the third number is variable from each of the frames to the next in the sequence, and such that the first and third number of timeslots are not contiguous.

The present invention will be more fully understood from the following detailed description of the preferred embodiments thereof, taken together with the drawings, in which:

DETAILED DESCRIPTION OF PREFERRED EMBODIMENTS

Figure 1:
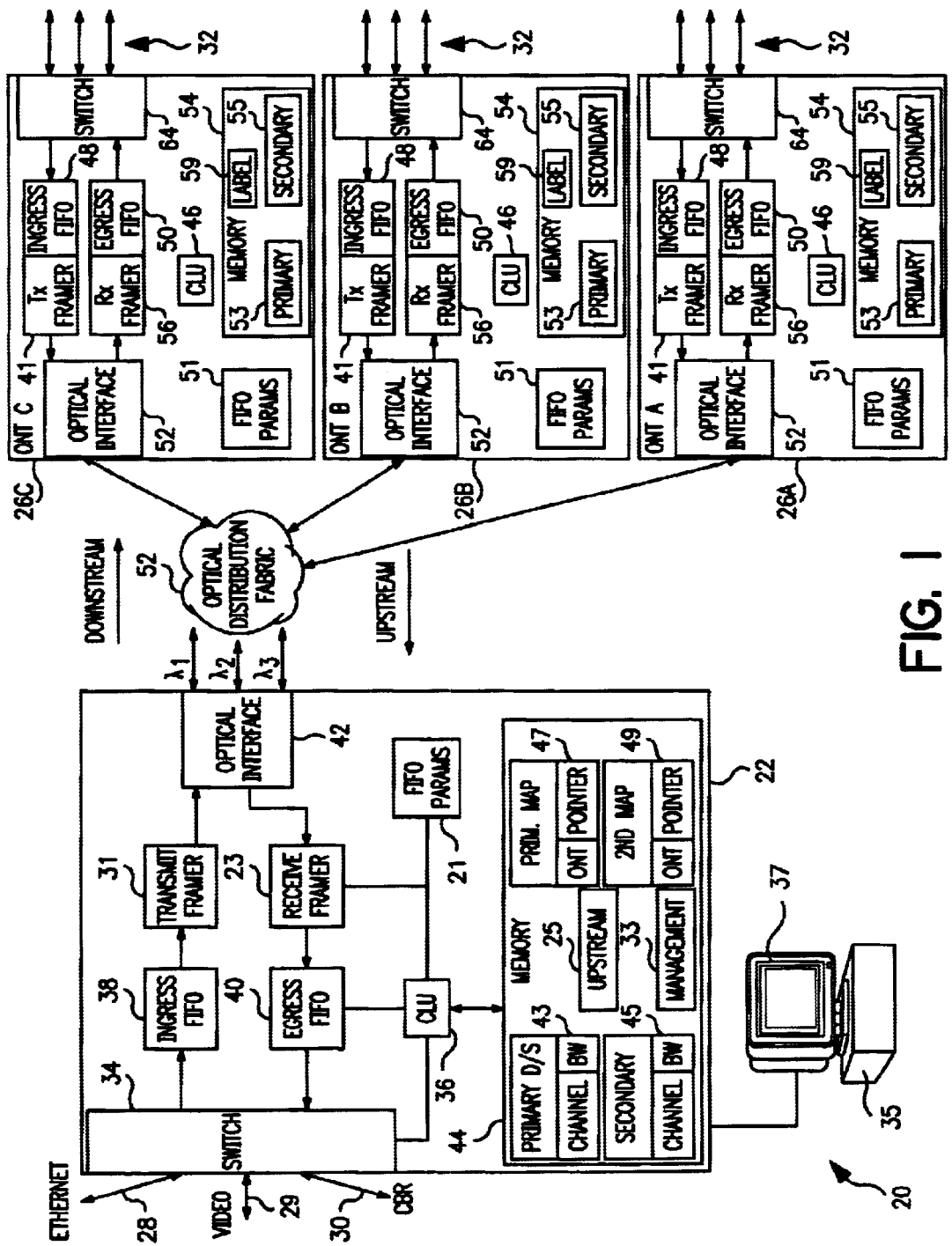
FIG. 1 is a schematic diagram of a passive optical network, according to a preferred embodiment of the present invention.

Reference is now made to FIG. 1 which is a schematic diagram of a passive optical network (PON) 20, according to a preferred embodiment of the present invention. PON 20 comprises an optical line terminal (OLT) 22 at the head end of a passive optical distribution fabric 24, the OLT acting as a central transmission point and an overall controlling device for PON 20. Fabric 24 is terminated at its downstream side by a plurality of generally similar optical network terminations (ONTs) 26A, 26B, 26C, . . . acting as respective receiving end points. Hereinbelow ONT 26A, ONT 26B, ONT 26C, . . . are also referred to herein collectively as ONTs 26, and respectively as ONT A, ONT B, ONT C, . . . . OLT 22 and ONTs 26 operate as data modems, so that OLT 22 is coupled at its upstream side to industry-standard data transfer services such as an Ethernet line 28, a video line 29, and a constant bit rate (CBR) line 30, and ONTs 26 are coupled at their respective downstream sides to data lines 32 which provide corresponding or lower-rate services to downstream clients of PON 20. PON 20 transfers data between OLT 22 and ONTs 26 in the form of downstream frames and upstream "virtual" frames, the frames being transmitted in a fully duplex manner. Full-duplex methods of transferring data, such as using different wavelengths for transmitting and receiving, are well known in the optical network art. Both downstream and upstream frame formats are described in more detail hereinbelow.

Downstream frames from OLT 22 are transmitted into fabric 24 in a substantially continuous sequence of constant period frames. Most preferably, downstream frames have a period of 125 s, and are implemented to transfer data downstream at a rate of approximately 2.5 Gb/s, although other periods and rates may be used. Fabric 24 splits the downstream transmissions passively so that all ONTs 26 receive the frames in a generally broadcast manner. In the upstream direction separate transmissions from the plurality of ONTs 26 are transmitted as windows which are combined in a virtual frame so that the separate windows do not collide when they arrive at OLT 22. The virtual upstream frames are implemented to have substantially the same period as the downstream frames. Upstream data transmissions are preferably transmitted at a rate approximately equal to the downstream rate, although another upstream rate may also be used.

OLT 22 comprises a control and logic unit (CLU) 36 which controls, via management software 33 comprised in a memory 44, the overall operation of PON 20 together with the operation of individual elements of the OLT. OLT 22 is coupled to a network monitor 37 and a keyboard 35, which enable an operator of PON 20 to both track behavior of the network and implement changes to the network via software 33. OLT 22 comprises a switch 34 which switches between coupled services to the OLT, according to controlling signals received from CLU 36. The CLU also controls the operation of a data ingress (from the upstream direction) First-In First-Out FIFO logical memory 38, a data egress (to the upstream direction) FIFO logical memory 40, a transmit framer 31, a receive framer 23, and a FIFO parameter table 21. The functions and operations of the FIFOs, framers, table 21, and of management software 33 are described in more detail hereinbelow.

OLT 22 also comprises an optical interface 42, which is controlled by CLU 36. Interface 42 converts data from transmit framer 31 to an optical format, most preferably by modulating a laser comprised in the interface and transmitting the laser output into fabric 24. Interface 42 also receives optical signals from fabric 24 and converts the signals to data which is then transferred to receive framer 23 wherein it is disassembled prior to upstream transmission via FIFO 40 and switch 34.

Preferably, interface 42 is able to transmit and receive its optical output in multiple discrete wavelength groups [1], [2], [3], . . . , substantially simultaneously, so that the capacity of PON 20 is effectively increased by the number of wavelength groups used. Each wavelength group comprises a first wavelength at which OLT 22 transmits downstream data and a second wavelength at which the OLT receives upstream data. PON 20 comprises sets of ONTs 26, each ONT 26 in a specific set operating in one of the wavelength groups by receiving the first wavelength and transmitting the second wavelength. Alternatively, interface 42 transmits and receives in one wavelength group, so that all ONTs 26 are comprised in one set. The format of frames transmitted in the multiple wavelength system and the single wavelength system is substantially the same, so that for clarity PON 20 is assumed to operate in one wavelength group, except where described otherwise hereinbelow.

Each ONT 26 comprises a CLU 46, an ingress FIFO 48, an egress FIFO 50, a transmit framer 41, a receive framer 56, a FIFO parameter table 51, an optical interface 52, a switch 64, and a memory 54, which respectively function in a generally similar manner to CLU 36, ingress FIFO 38, egress FIFO 40, transmit framer 31, receive framer 23, table 21, optical interface 42, switch 34, and memory 44. When multiple discrete wavelength groups [1], [2], [3], . . . , are used in PON 20, each optical interface 52 is implemented to transmit and receive data at one of the discrete groups, and not to respond to wavelengths of the other groups, most preferably by an optical filter within the optical interface.

Communications in PON 20 are categorized into channels, each channel transferring data of a specific service between OLT 22 and a specific ONT 26 or set of ONTs, so that there is a one-to-one mapping between services supported by the PON and channels used for the transfer. OLT 22 and each ONT 26 maintain primary and secondary tables of channel parameters. OLT 22 comprises a primary downstream channel table 43, in memory 44, mapping channels to their allocated downstream bandwidths and channel labels, and a secondary downstream table 45 which is used when adjustments to channel downstream bandwidths are made. OLT 22 also comprises primary and secondary pointer tables 47 and 49, used respectively for tracking and updating ONT 26 window parameters. OLT 22 further comprises a table 25 mapping ONTs 26 and respective channel labels. Functions of tables 25, 43, 45, 47, and 49 are described in more detail below.

Each ONT 26 comprises a primary upstream channel table 53 in respective memory 54, each primary table mapping channels of the specific ONT 26 to their allocated upstream bandwidths and channel labels. Each ONT 26 also comprises a respective secondary upstream channel table 55 which is used when adjustment to channel upstream bandwidths are made, and a table 59 of downstream channel labels. More details of the operation of these tables are given below.

A channel is provisioned in PON 20 for a service which is coupled to the PON. Most preferably, the provisioning is implemented by an operator of the PON, via keyboard 35 and monitor 37, the operator also allocating resources, such as upstream and downstream bandwidths, to the channel.

Channels are most preferably classified at provisioning as being either constant bit rate (CBR) channels or packet-based (PB) channels. For example, a channel for data originating from Ethernet line 28 will typically be a PB channel. When a channel is provisioned, parameters comprising a channel label and an upstream and downstream bandwidth allocated to the channel are entered into the respective upstream and downstream primary tables. Most preferably, bandwidth is allocated in terms of 4-byte timeslots, although any other convenient timeslot size may be used. The bandwidth allocated for a particular channel is most preferably greater than the incoming data rate. For example, for a CBR channel on line 30 where the frequency is 1.544 Mbit/s, the necessary bandwidth of a 125 s frame is 193 bits, which is accommodated by setting the bandwidth of the channel at seven 4-byte timeslots. More details of frame characteristics used in network 20, and of bandwidths and adjustments to bandwidths assigned to specific channels, including PB channels, are given hereinbelow.

Ingress FIFO 38 acts as an initial buffer for downstream data to OLT 22, and most preferably comprises separate memories according to the types of services coupled to OLT 22. Data from CBR channels are written to FIFO 38 at the clock rate of the CBR service. Most preferably, only valid packets, i.e., no idle bytes, are written from PB channels to FIFO 38. The data is written to FIFO 38 after receipt from lines 28, 29, and 30 and after transferring through switch 34. As appropriate, parameters for channels written to FIFO 38 are written to FIFO parameter table 21. For example, for a PB channel, table 21 preferably includes an allocated maximum burst size (MBS), an allocated maximum burst rate (MBR) of the channel and a guaranteed bit rate (GBR); for a CBR channel table 21 preferably includes a GBR of the channel.

In reading from FIFO 38, CLU 36 reads the channel's allocated downstream bandwidth from primary table 43, and data from table 21. Data, up to the allocated bandwidth, subject to any limitations of parameters in table 21, is transferred to transmit framer 31 from FIFO 38 by CLU 36. Framer 31 is used by CLU 36 to assemble data prior to transmission into fabric 24. The manner of transmission of downstream data is described in more detail below.

In ONTs 26 ingress FIFO 48 and transmit framer 41 operate generally as FIFO 38 and framer 31 respectively. In reading from FIFO 48, each CLU 46 reads the channel upstream bandwidth from the respective primary table 53, and also reads channel parameters from table 51. For each ONT 26 data, subject to limitations of table 21, is transferred to transmit framer 41 from FIFO 48 by CLU 46, the framer being used to assemble data prior to transmission into fabric 24. Transmission of upstream data is described in more detail below.

Figure 2:
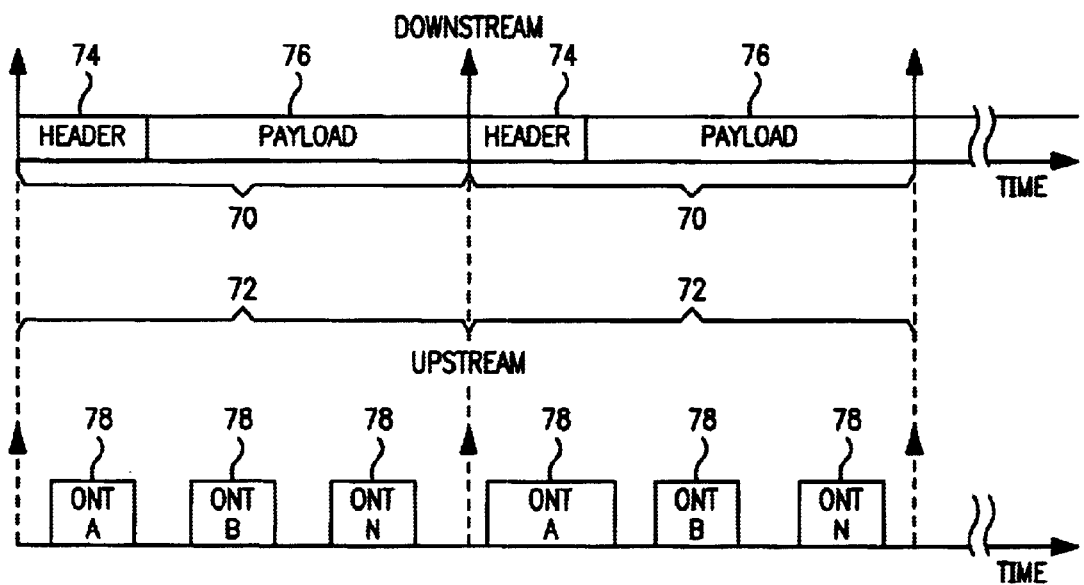
FIG. 2 is a schematic timing diagram showing overall structure of a downstream frame and a virtual upstream frame transmitted in the network of FIG. 1, according to a preferred embodiment of the present invention.

FIG. 2 is a schematic timing diagram, showing overall structure of a downstream frame 70, and a virtual upstream frame 72, according to a preferred embodiment of the present invention. Each downstream frame 70 is transmitted from OLT 22 with a substantially equal period, hereinbelow termed a network period, most preferably set at 125 s. Each downstream frame 70 comprises a header 74, at least part of which serves, inter alia, as a means for receiving ONTs to identify a beginning of the frame, and thus acts as a starting marker for frame timing throughout PON 20. Each downstream frame 70 also comprises a payload section 76, wherein data from OLT 22 (from services transmitting on lines 28, 29, and 30) for transfer to ONTs 26 is entered. Downstream frames 70 are transmitted on a substantially continuous basis, with no idle time between adjacent frames.

During each network period defined by respective adjacent downstream headers 74, each ONT 26 is able to send upstream data. For each period, OLT 22 allocates each ONT 26 respective windows of time 78 within which it is able to transmit the upstream data, divided in the window according to channels. Each window 78 comprises a start time, relative to the starting marker defined by frame header 74, and a length of time during which the specific ONT is permitted to transmit. By way of example, windows 78 for adjacent virtual frames 72 are shown in FIG. 2 for ONT A, ONT B, and ONT N. As described in more detail below, window start times and lengths are allocated within each virtual frame 72 so that windows 78 do not overlap, ensuring that there are no collisions of data from different ONTs at OLT 22. The allocations are determined by CLU 36, and are communicated to ONTs 26 in downstream frames 70. It will be appreciated that start times and lengths of windows 78 are dynamic, and may be changed from frame to frame. In addition to conveying upstream data for respective services in channels, as described above, windows 78 may also convey other data. Data in such windows includes bandwidth change requests and ranging information data, which are described in more detail below, as well as other management and control windows.

Figure 3:
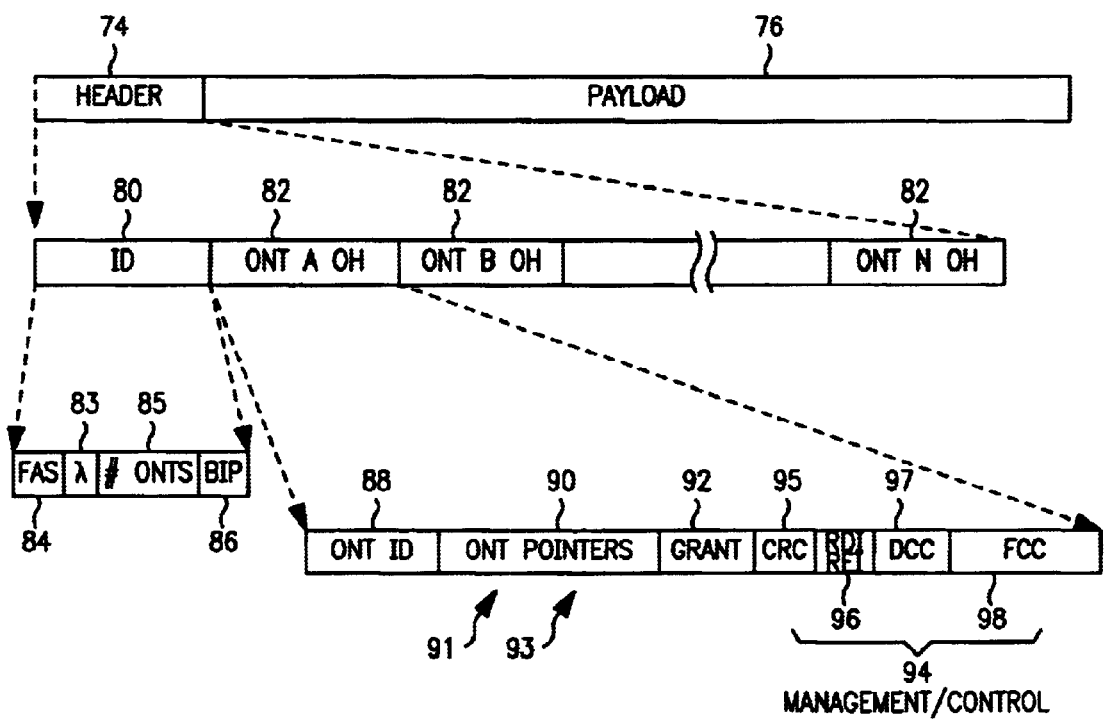
FIG. 3 is a schematic diagram showing structure of a downstream frame header, according to a preferred embodiment of the present invention.

FIG. 3 is a schematic diagram showing structure of downstream frame header 74, according to a preferred embodiment of the present invention. Header 74 comprises a frame identification section 80, which in turn consists of a frame alignment signal (FAS) section 84, a wavelength identification section 83, a number of ONTs section 85, and a bit interleaved parity (BIP) section 86. FAS section 84 preferably comprises eight bytes, and is used by the ONTs as a start-of-frame identifier. When PON 20 operates with more than one wavelength, section 83 identifies which wavelength group [1], [2], [3], . . . the frame is using, and section 85 indicates the number of ONTs operating in that wavelength group. When a single wavelength group is used in PON 20, section 85 indicates the number of ONTs operative within the network. BIP section 80 is used as an error monitoring function, and preferably comprises a BIP-8 code function, as is known in the art, using even parity calculated on all bits of an immediately preceding frame.

Header 74 also comprises one or more ONT header sections 82, each of sections 82 being directed to a specific ONT 26. The number of header sections 82 corresponds to the number of ONTs 26 with which frame 70 communicates. Each ONT header section 82 comprises a one-byte ONT identification section 88, and a window pointer section 90. Pointer section 90, preferably three bytes long, comprises information to be used by the specific ONT in transmitting its data upstream. Pointer section 90 consists of a start window transmission time 91 (measured from receipt of FAS section 84) when the specific ONT is to begin transmitting its data in a respective window 78. Section 90 also includes a maximum length 93 of window 78 the ONT is permitted to transmit. Length 93 corresponds to the overall upstream bandwidth allocated to the specific ONT 26, and is calculated by management software 33 on the basis of total upstream channel bandwidth requests received from all ONTs 26.

A grant section 92, preferably 4 bits long, comprises a control code used by OLT 22 to control the upstream transmission from each ONT. The control code preferably comprises codes, which each receiving ONT interprets, describing the data which each specific ONT should, or should not, transmit. For example, grant section 92 instructs a specific ONT to transmit its window 78, to halt transmission, or to send one of a number of management or control types of data-window.

An ONT management and control channel section 94 is used, inter alia, as a protection check for sections 88, 90, and 92. Section 94 comprises a cyclic redundancy check (CRC) section 95, a remote monitoring section 96, a data communication channel (DCC) section 97, and a fast communication channel (FCC) section 98. CRC section 95 is used to protect section 88, section 90 (comprising time 91 and length 93), and section 92. The ONT identified in section 88 compares a CRC received in section 95 with a value expected for sections 88, 90, and 92. If an error is detected by the comparison, the ONT most preferably halts upstream transmission until a frame is received with a correct CRC in section 95. Remote monitoring section 96 comprises a remote defect indication (RDI) and a remote error indication (REI). An RDI is sent from OLT 22 to a specific ONT when OLT 22 detects a defect, such as an absence or loss of a window 78 from the ONT, or if there is excessive error in the received window. The REI comprises a count of a number of errors detected by OLT 22 in the last data-window received by the OLT.

DCC section 97 and FCC section 98 comprise regions enabling OLT 22 to send management information specific to the ONT 26, and/or any other management related information. For example, changes in a downstream bandwidth for a specific channel handled by the ONT 26 may be sent via DCC section 97. Decoding of section 97 is preferably implemented by software in the specific ONT 26. FCC section 98 is most preferably implemented by a combination of hardware, at the physical level of the ONT, and software, so that section 98 may be used to convey management and/or control messages to the ONT 26 at a faster rate than DCC section 97.

Figure 4:
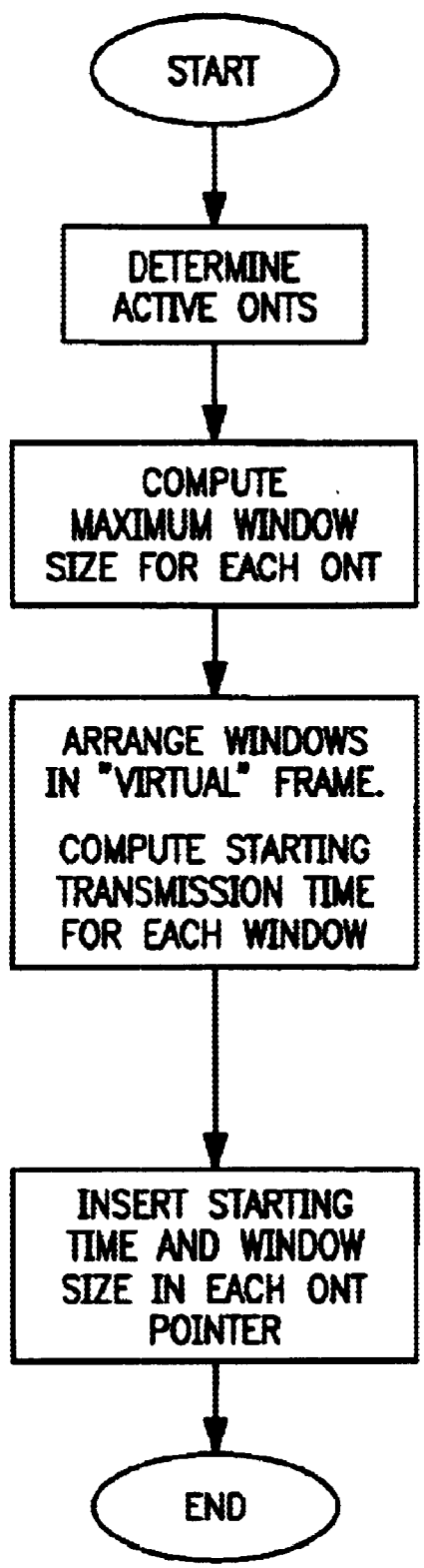
FIG. 4 is a flowchart showing how the header of FIG. 3 is computed, according to a preferred embodiment of the present invention.

FIG. 4 is a flowchart showing how header 74 is computed by CLU 36 using management software 33, according to a preferred embodiment of the present invention. The steps of the flowchart are most preferably implemented by CLU 36 before each downstream frame 70 is transmitted from the OLT. In a first step, CLU 36 determines how many ONTs 26 are active in PON 20. Methods for performing such determination are known in the art, and include noting which ONTs 26 have transmitted data to OLT 22 during a predetermined time period prior to the step being implemented. Most preferably, the method used includes processes for noting when a new ONT 26 comes on-stream, as well as when an ONT 26 goes off-stream.

In a second step, CLU 36 computes a maximum window size, in timeslots, of each window 78 for each respective active ONT 26 determined in the first step. The total of the maximum sizes is set by CLU 36 to be less than the downstream bandwidth capacity. Within this limitation, the window size for each ONT 26 is set according to data parameters of each active channel being conveyed upstream by the specific ONT 26. Preferably, the data parameters of each channel include whether the channel is a CBR or a PB channel, a priority which is assigned by an operator of PON 20, the amount of data for the specific channel in the respective ingress FIFO 48, and the bandwidth assigned to the channel in the primary table 53 of the ONT 26. (The bandwidth is known to OLT 22 from when the channel is provisioned, or, as described below, when a bandwidth change is implemented.) Data parameters for each PB channel most preferably also comprise an upstream guaranteed bit rate (GBR) and an upstream maximum burst rate (MBR) allocated by the network operator. Most preferably, the number of timeslots allocated to each PB channel exceeds the upstream GBR. The number of timeslots allocated to each CBR channel most preferably exceeds a worst-case possible upstream frequency of the channel.

Most preferably, at least some of the data parameters are transmitted in a management and control data-packet sent by the specific ONT 26, and at least some are preferably stored in FIFO parameters table 21. The management and control data-packet is most preferably sent by the ONT 26, prior to OLT 22 computing the window size for the ONT 26, in one or more previous windows 78, in response to a request generated by software 33.

In a third step, CLU 36 arranges the windows 78 computed in step two preferably contiguously in a "virtual" frame, and determines an initial start time for each window 78 relative to a frame starting time, corresponding to the beginning of header 74. A ranging time and a margin time, described below, are added to each initial start time, to generate a start window transmission time which is to be used for each window 78.

Each ONT 26 is some distance from OLT 22, the distance causing a delay in signal transmission from the specific ONTs 26 to OLT 22 proportional to the distance, due to the finite speed of transmission of the optical signals. The distance of each ONT 26 from OLT 22 is compensated for by adding the ranging time to each ONT's initial window start time. The ranging time for each ONT 26 is determined by one of the ranging methods known in the passive optical network art, such as by sending a ranging signal from OLT 22 into PON 20, and waiting for corresponding responses being received from active ONTs 26. Preferably, the ranging signal is sent when PON 20 initializes. Alternatively or additionally, the ranging signal is sent while network 20 is operative, such as when OLT 22 determines that a new ONT 26 has come on-stream, or when there has been an effective change in operating parameters of an existing ONT 26. OLT 22 determines the ranging time for each ONT 26 once ranging signal responses have been received from each ONT 26 operative in PON 20.

CLU 36 adds a margin time to the initial start time and the ranging time, to insure that there is some temporal separation of windows 78 arriving at OLT 22. The margin time also allows for errors in arrival times at OLT 22, due to factors such as differences and/or drifts in clocks in each of the ONTs 26, physical changes over time of components of PON 20, and inaccuracies in the ranging process.

In a final step, CLU 36 inserts the computed start window transmission time, the maximum window size, and CRC section 95, into pointer section 90 of each ONT header section 82. The time and size of each window are also stored, according to the specific ONT 26, in pointer table 47.

Figure 5:
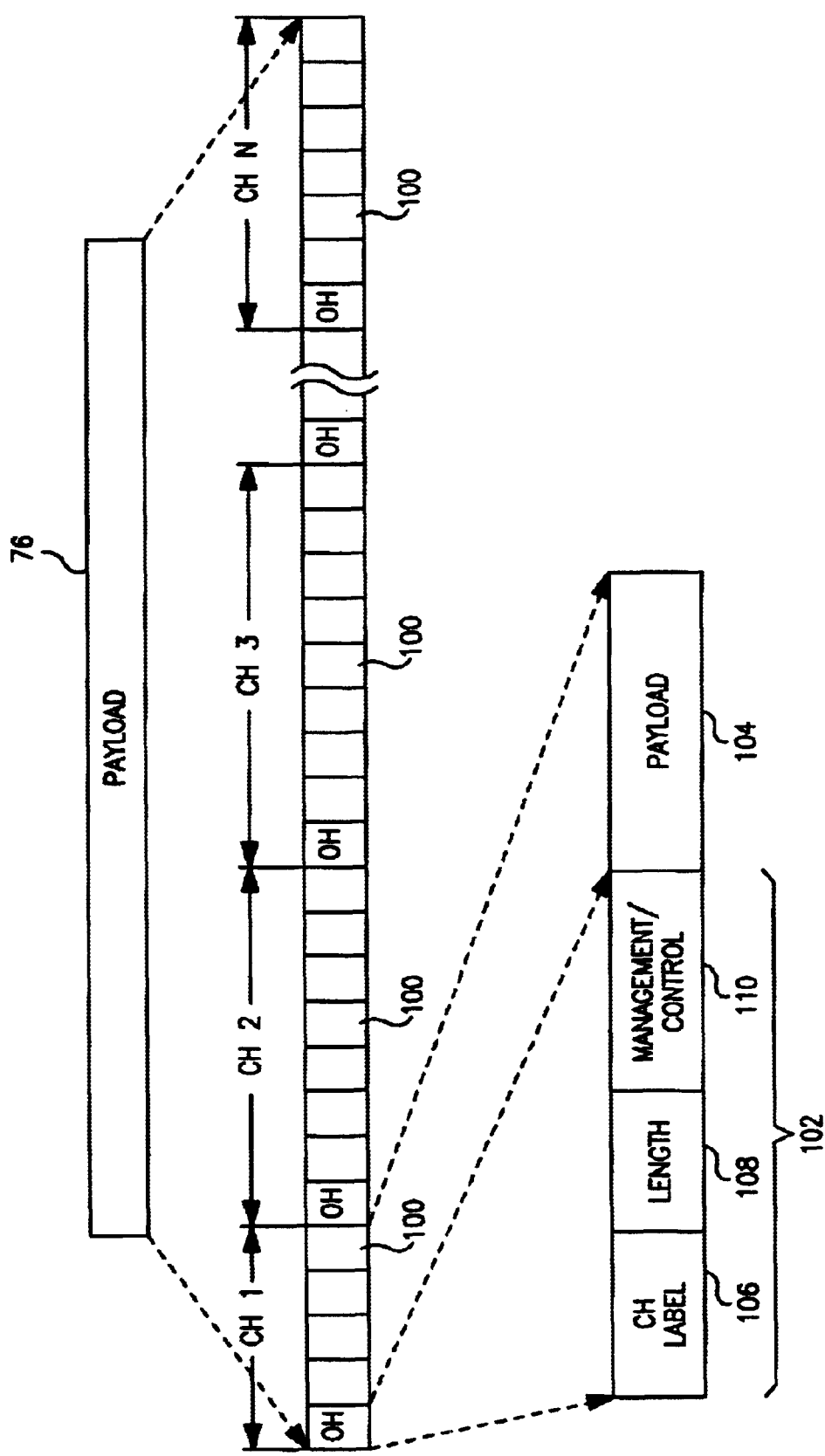
FIG. 5 is a schematic diagram of a payload section of the downstream frame, according to a preferred embodiment of the present invention.

FIG. 5 is a schematic diagram of payload section 76 of downstream frame 70, according to a preferred embodiment of the present invention. Payload section 76 comprises data sent from OLT 22 to the plurality of ONTs 26. The data is incorporated into section 76 on a variable time multiplexed basis, so that for each frame 70 OLT 22 allocates one or more data-channels 100 for each of the ONTs to which data is to be transmitted. A size of each data-channel is calculated by CLU 36 using management software 33, according to predetermined criteria, as described with reference to FIG. 6 below, and for each ONT 26 the size of the respective data-channel is able to vary from frame to frame.

A data-channel is constructed from a group of timeslots. Each data-channel is identified by a channel label (described below) and transports data belonging to a single channel, the channel label being read from table 43. Most preferably, each data-channel 100 in payload 76 is contiguous with adjacent data-channels 100. Alternatively, adjacent data-channels 100 are separated by one or more "idle" bits. Each data-channel 100 comprises a channel overhead section 102 and a channel payload section 104. Channel overhead sections 102 are substantially similar in size and construction. Channel payload sections 104 typically differ in size from each other, and from frame to frame, the size for each channel being calculated on an on-going basis.

Each channel overhead section 102 comprises a channel label field 106, a length field 108, a management and control field 110, and a CRC section which guards the preceding data. Channel label field 106 comprises a unique label which is assigned by CLU 36 when the channel is provisioned, and which is stored in table 43 of OLT 22 and in respective tables 59 of relevant ONTs 26. As described below, channels, their lengths, and their labels, are tracked in both OLT 22 and each ONT 26.

Length field 108 gives a size of payload section 104, in terms of timeslots, of the associated data-channel 100. Field 108 is most preferably divided into two sections, a 2-bit multiplier section and a 10-bit length section. The size of the payload is calculated by multiplying a value associated with the 2-bit value by the 10-bit value. Management and control field 110 is preferably generally similar in form and function to management and control section 94 (FIG. 3). Field 110 most preferably comprises sub-fields which enable OLT 22 to set a channel priority and/or generate a channel alarm such as if an incorrect CRC checksum has been previously received in the specific channel. Preferably, field 110 also enables OLT 22 to communicate channel management information to the specific ONT 26.

Figure 6:
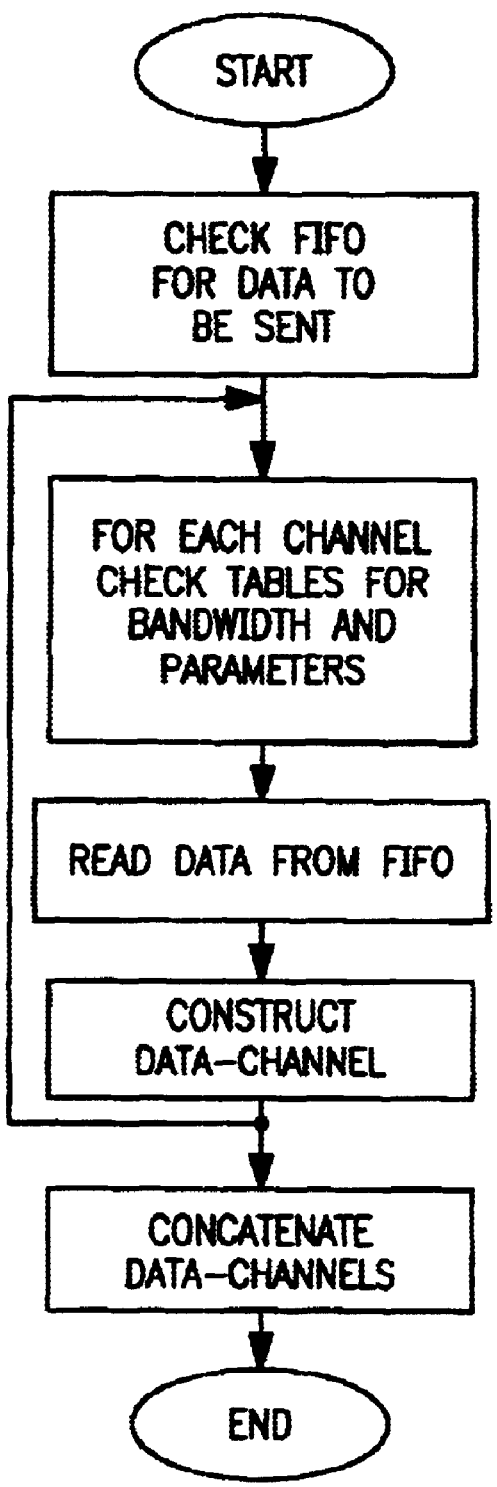
FIG. 6 is a flowchart showing how the payload section is computed, according to a preferred embodiment of the present invention.

FIG. 6 is a flowchart showing construction of payload section 76 using management software 33, according to a preferred embodiment of the present invention. The steps of the flowchart are performed before each downstream frame 70 is sent from OLT 22.

In a first step, CLU 36 checks ingress FIFO 38 for data to be incorporated into section 76.

In a second step, for each channel of data in FIFO 38, CLU 36 determines from primary table 43 the allocated downstream bandwidth of the channel and the channel label. For each channel CLU 36 also determines data parameters in table 21.

In a third step, data for each channel, up to the channel's allocated bandwidth and subject to any limitations generated by parameters in table 21, is read from FIFO 38.

In a fourth step, channel overhead section 102 is constructed, incorporating the channel label and length, and the data read from the FIFO is incorporated into channel payload section 104, to form data-channel 100 for the specific channel.

Steps two to four are repeated for each channel of data in FIFO 38, and in a final step the data-channels 100 which are generated for each channel are concatenated to form downstream payload section 76. Steps two to four and the final step are most preferably implemented by CLU 36 using transmit framer 31 when constructing section 76.

It will be appreciated that downstream data frames 70 are transmitted in a broadcast manner, so that a specific ONT 26 receives data which is not directed to that ONT. Most preferably, data transmitted in payload sections 104 is encrypted so that only the ONT to which the data is directed is able to decrypt the data. Such methods of encryption and decryption are well known in the art, and include "churning" of the data. If churning is used, most preferably a churning key is generated by each ONT 26, and is sent in a management and control upstream window 78 to OLT 22, which then churns the channel payload data before it is entered into payload section 104. De-churning is then performed at the ONT using the churning key. Most preferably a new churning key is sent from each ONT 26 at regular intervals of less than 1 s.

It will be understood that the structure of downstream payload section 76 enables changes in bandwidths for transmitted channels to be implemented for each downstream frame 70. Such changes are most preferably implemented using secondary table 45, as described in more detail below with reference to FIG. 8.

Downstream payload section 76 is constructed on a time multiplexed "per-channel" basis, each data-channel 100 being defined by its channel header 102 (FIG. 5). Each specific ONT 26 recovers data-channels directed to it from section 76 by comparing labels 106 in headers 102 with the channel labels in tables 59 of each ONT 26. It will be appreciated that data-channels directed to a specific ONT 26 do not necessarily have to be contiguous in section 76, since each ONT 26 checks for channel labels. Thus any specific ONT 26 may receive its time multiplexed data in a fragmented form, the fragmentation being by channel. It will be appreciated that allowing fragmentation of data transmitted to a specific ONT significantly increases the "packing" efficiency of section 76.

Figure 7:
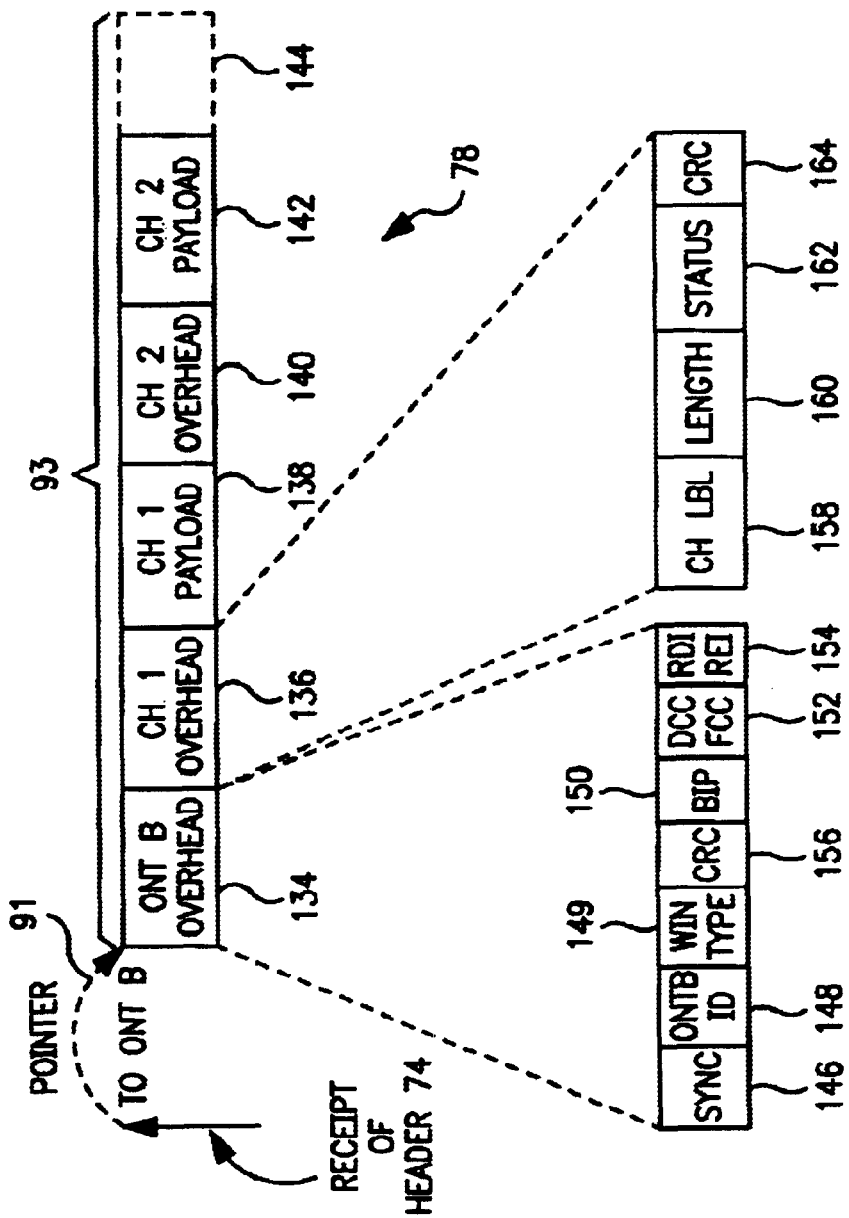
FIG. 7 is a schematic diagram showing details of an upstream window of the network of FIG. 1, according to a preferred embodiment of the present invention.

FIG. 7 is a schematic diagram showing details of upstream window 78 of ONT 26B, according to a preferred embodiment of the present invention. Data in upstream window 78 is generated and transmitted by ONT 26B, although it will be understood that the following description applies, *mutatis mutandis*, to transmission and generation of data in an upstream window 78 from any ONT 26. Window 78 is implemented by ONT 26B so that on reception of the window at OLT 22, the window does not overlap with any other windows 78 transmitted by other ONTs 26, as shown schematically in FIG. 2. Window 78 is only transmitted from ONT 26B after receipt by the ONT of an ONT 26B overhead section 82 (FIG. 3). As described with reference to FIG. 3, section 82 comprises pointer section 90 having start window transmission time 91 and maximum window length 93.

Window 78 comprises a general ONT 26B overhead section 134, followed by alternating channel overhead and channel payload sections. By way of example, window 78 for ONT 26B is assumed to comprise two channels, each having an overhead section 136 and 140, and a payload section 138 and 142. General overhead section 134 comprises a synchronization field 146, an identification field 148, a window type field 149, a CRC field 156, a BIP field 150, a DCC/FCC field 152, and an RDI/REI field 154. Fields 146 and 148 enable OLT 22 to identify ONT 26B as the transmitting ONT, and also enable the OLT to synchronize a burst-mode receiver comprised in the OLT. Field 149 indicates a window composition, such as a data window. CRC field 156 provides a checksum for protecting data transmitted in synchronization field 146, identification field 148 and window type field 149. BIP field 150 is implemented and functions in a generally similar manner to BIP section 80 (FIG. 3). DCC/FCC field 152 is implemented and functions in a generally similar manner to sections 97 and 98, providing a field for general management and control messages for ONT 26B. RDI/REI field 154 is implemented and functions in a generally similar manner to section 96, acting as a remote monitoring field.

Each channel overhead section 136 and 140 comprises a channel label field 158 and a channel length field 160. Field 158 is derived from channel label table 53 in ONT 26B. Field 160 is most preferably substantially similar in form to length field 108 described above with reference to FIG. 5. Each channel overhead section also preferably comprises a status field 162, used, for example, to convey an alarm regarding the specific channel to OLT 22, and a CRC field 164, which comprises a checksum protecting fields 158, 160, and 162. Each channel overhead section is followed by its channel payload section, having a length defined by its respective channel overhead section 160.

The length of each channel payload section is determined by CLU 46 of ONT 26B, according to the overall constraint that the length of window 78 is less than or equal to maximum window length 93 received in pointer 90. Within this constraint, CLU 46 constructs channel payload sections by reading, from ingress FIFO 48, FIFO parameters table 51, and primary table 53, specific channel data, data parameters, and the corresponding allocated bandwidth of each channel. After construction of window 78, ONT 26B transmits the window upstream at start window transmission time 91 after receipt of header 74.

Figure 8:
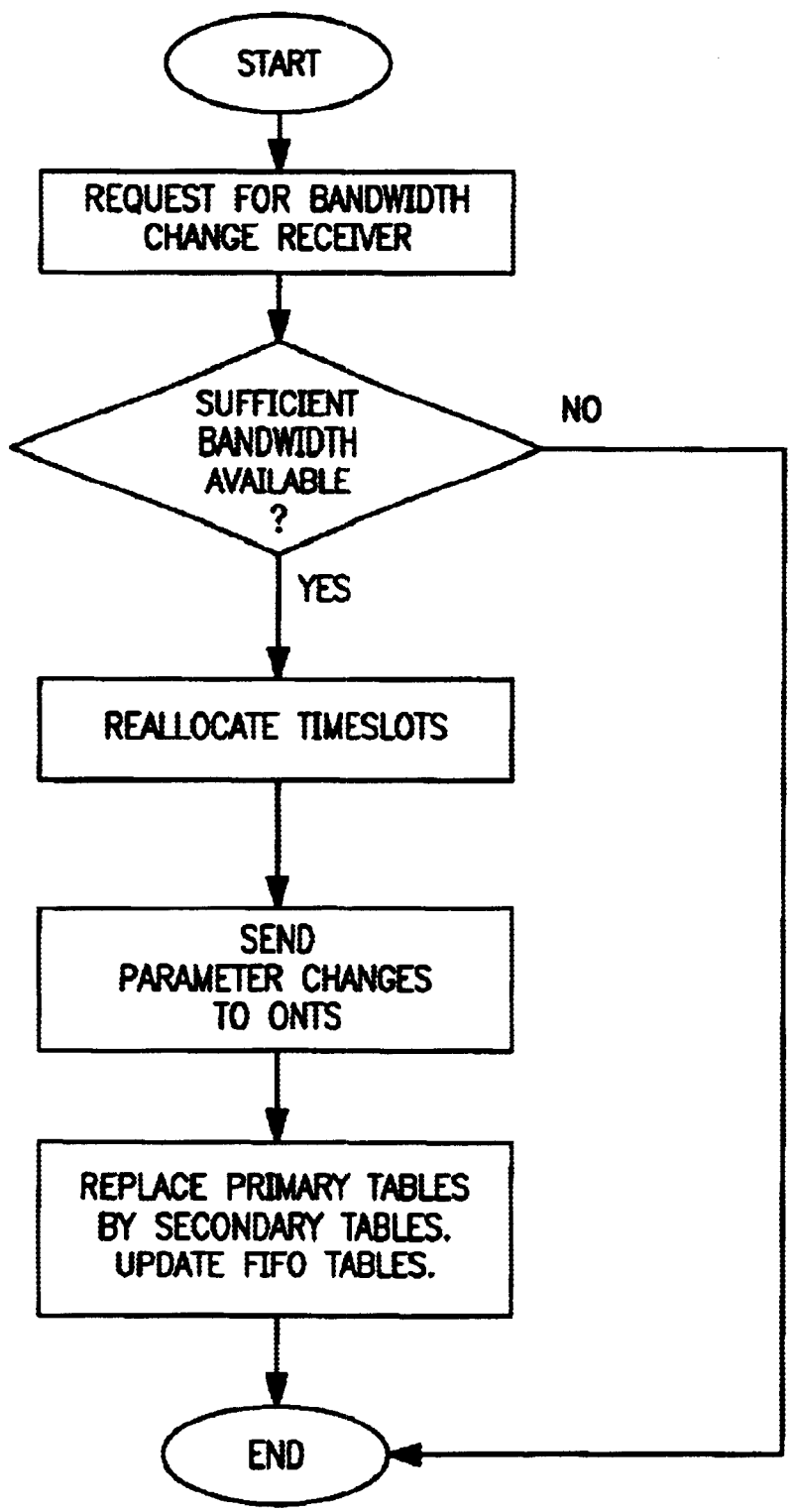
FIG. 8 is a flowchart showing steps involved in implementing a change in bandwidth of a channel, according to a preferred embodiment of the present invention.

FIG. 8 is a flowchart showing steps involved in implementing a change in bandwidth of a channel, according to a preferred embodiment of the present invention. Typically, when a channel is provisioned the channel is assigned an upstream and a downstream bandwidth according to the type of service which provides the channel and/or according to a service level agreement (SLA) between an operator of PON 20 and a user of the network. Each channel label and respective downstream bandwidth are written to primary table 43 of OLT 22. Primary table 53 of each ONT 26 contains channel labels and upstream bandwidths of channels transferred through the particular ONT 26. The flowchart of FIG. 8 is implemented by CLU 36 using management software 33.

In a first step, a request for a change in bandwidth of a channel is received by CLU 36. Preferably, the request is initiated by a user of the channel, and typically comprises a request to increase an upstream and/or a downstream bandwidth of the channel. Most preferably, the request is implemented by the operator of the network via keyboard 35.

In a second step, CLU 36 checks if sufficient spare bandwidth is available to accommodate any requested increase, by evaluating the total number of timeslots already allocated to downstream frame 70, and/or to upstream virtual frame 72. If there is sufficient spare bandwidth available, the request for bandwidth change continues; if there is insufficient bandwidth available, the process halts.

In a third step CLU 36 reallocates timeslots for the channel. If the new bandwidth allocation is for downstream bandwidth, the reallocated timeslots may be in an existing data-channel 100 location (FIG. 5). Alternatively, more bandwidth may be assigned to a specific channel by generating a second data-channel 100 with a label 106 corresponding to the channel. The two data-channels may reside anywhere in section 76, and do not necessarily have to be contiguous, thus increasing the flexibility with which section 76 may be arranged, and the packing efficiency of the section.

If the new bandwidth allocation is for upstream bandwidth, adjustments are made to the size and position of windows 78 as necessary. For example, referring to FIG. 7, an increase in channel 1 bandwidth may be accomplished by adding a second section for channel 1 (the section comprising channel 1 overhead and payload sections) in a region 144, maintaining section 93 fixed. The two sections for channel 1 do not have to be contiguous, so that the advantages described for downstream frames also apply.

If a larger increase in upstream bandwidth is requested, section 93 may have to be increased in size, and/or positions of other windows 78 may have to be adjusted within virtual frame 72. Size and/or position changes of windows 78 are conveyed to ONTs 26 via appropriate sections 90 of downstream frame 70.

In a fourth step, channel changes are transmitted to appropriate ONTs 26, i.e., those ONTs 26 which are affected by the changes implemented, via downstream frame 70. The changes may be transferred via section 94 (FIG. 3) and/or sections 110 (FIG. 5) of frame 70, and are incorporated in respective secondary tables 55.

In a final step, primary table 43 is replaced by table 45 in OLT 22 and primary tables 53 are replaced by their respective secondary tables 55. FIFO parameter tables 21 and 51 are also updated as necessary. Operation of PON 20 then continues with the updated bandwidths.

It will be understood that generally the same process as described hereinabove applies to provisioning a new channel and de-provisioning of an existing channel.

It will be further understood that preferred embodiments of the present invention may be implemented in communication networks, including a network consisting of one transmitter and one receiver, other than passive optical networks such as PON 20. All such networks are included within the scope of the present invention. Furthermore, it will be appreciated that data transferred by preferred embodiments of the present invention is not specific to any one protocol or service, and may be transmitted into and from the network according to substantially any protocol or service.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for downstream communication from a central transmission point to a plurality of receiving end points by time division multiplexing of a sequence of frames, each of which is divided into multiple timeslots, the method comprising:

receiving at the central transmission point data for transmission to the end points, the data comprising at least a first quantity of a first data for transmission to a first end point among the plurality of end points and a second quantity of a second data for transmission to a second end point among the plurality of end points, such that the first and second quantities are variable from each of the frames to the next in the sequence;

responsive to the first and second quantities, allocating in each of the frames a first number of the timeslots to carry the first data to the first end point, and a second number of the timeslots to carry the second data to the second end point, such that the first and second numbers are variable from each of the frames to the next in the sequence responsive to variations in the first and second quantities of the data;

inserting in each of the frames at least one first end-point field and at least one second end-point field respectively identifying the first and the second numbers of timeslots in each of the frames; and transmitting the data from the central transmission point to the end points during the allocated timeslots.

2. A method according to claim 1, wherein the central transmission point comprises an optical line terminal (OLT), and the end points comprise optical network terminals (ONTs), wherein the OLT and ONTs are operative as transceivers in a passive optical network.

3. A method according to claim 1, wherein the data comprises sets of data which are conveyed via respective different industry-standard services.

4. A method according to claim 1, wherein the plurality of end points comprises sets of end points operative at different wavelength groups, and wherein the data comprises respective sets of data which are conveyed between the central transmission point and the respective sets of end points via the different wavelength groups.

5. A method according to claim 1, wherein the data comprises sets of data which are conveyed via respective different channels, wherein each channel transfers data via a service coupled to the central transmission point and at least one of the end points.

6. A method according to claim 5, and comprising assigning each channel a respective bandwidth, and wherein allocating the first and the second numbers of timeslots comprises allocating the first and the second numbers of timeslots responsive to the bandwidth of each of the channels.

7. A method according to claim 6, wherein assigning each channel the respective bandwidth comprises changing the respective bandwidth to a different bandwidth responsive to a request received by the central transmission point.

8. A method according to claim 1, wherein the first and second numbers of timeslots are allocated responsive to respective first and second data parameters stored in a memory comprised in the central transmission point.

9. A method according to claim 1, wherein a total of the first number and the second number of the timeslots is less than or equal to a bandwidth of each of the sequence of frames.

10. A method according to claim 1, wherein the data comprises one or more further quantities of data for transmission to respective one or more further end points among the plurality of the end points, such that the one or more further quantities are variable from each of the frames to the next in the sequence, and comprising allocating respective one or more further numbers of timeslots to be carried respectively to the one or more further end points.

11. A method according to claim 1, wherein a period of each of the sequence of frames is substantially constant.

12. A method according to claim 1, wherein each of the sequence of frames comprises a header comprising respective window parameters for each of the plurality of end points, each window parameter comprising a time and a size of a window of upstream data which each of the plurality of end points is permitted to transmit to the central transmission point.

13. A method according to claim 12, wherein the respective window parameters are allocated by the central transmission point so that the windows do not collide at the central transmission point.

14. A method according to claim 1, comprising:

inserting in each of the frames a frame header including first-end-point-parameters directed to a first end point and second-end-point-parameters directed to a second end point, wherein the first-end-point-parameters include values indicative of a first timing window during which the first end point is able to transmit first end point upstream data to a central transmission point, and wherein the second-end-point-parameters include values indicative of a second timing window during which the second end point is able to transmit second end point upstream data to the central transmission point, and wherein the first timing window does not overlap the second timing window.

15. A method for downstream communication from a central transmission point to a plurality of receiving end points by time division multiplexing of a sequence of frames, each of which is divided into multiple timeslots, the method comprising:

receiving at the central transmission point data for transmission to the end points, the data comprising at least a first quantity of a first data for transmission to a first end point among the plurality of the end points and a second quantity of a second data for transmission to a second end point among the plurality of the end points, such that the first and second quantities are variable from each of the frames to the next in the sequence;

responsive to the first and second quantities, allocating in each of the frames a first number of the timeslots to carry the first data to the first end point, and a second number of the timeslots to carry the second data to the second end point, such that the first and second numbers are variable from each of the frames to the next in the sequence responsive to variations in the first and second quantities of the data; and transmitting the data from the central transmission point to the end points during the allocated timeslots, wherein the data comprises at least a third quantity of a third data for transmission to the first end point, such that the third quantity is variable from each of the frames to the next in the sequence, and comprising, responsive to the third quantity, allocating in each of the frames a third number of timeslots to carry the third data to the first end point, such that the third number is variable from each of the frames to the next in the sequence, and such that the first and third number of timeslots are not contiguous.

16. An apparatus for downstream communication in a passive optic network by time division multiplexing of a sequence of frames, comprising:

a passive optical distribution fabric which is adapted to receive and convey data;

a plurality of receiving optical network terminations (ONTs) coupled to the optical distribution fabric comprising first and second ONTs which are adapted to receive the data from the optical distribution fabric; and a central optical line terminal (OLT) coupled to the optical distribution fabric which is adapted to receive the data for transmission into the optic network, the data comprising at least a first quantity of a first data for transmission to the first ONT and a second quantity of a second data for transmission to the second ONT, such that the first and second quantities are variable from each of the frames to the next in the sequence, to allocate in each of the frames a first number of timeslots to carry the first data to the first ONT and a second number of timeslots to carry the second data to the second ONT, such that the first and second numbers are variable from each of the frames to the next in the sequence responsive to variations in the first and second quantities of the data, to insert in each of the frames at least one first ONT-field and at least one second ONT-field respectively identifying the first and the second numbers of timeslots in each of the frames, and to transmit the data during the allocated timeslots.

17. Apparatus according to claim 16, wherein the data comprises sets of data which are conveyed via respective different industry-standard services.

18. Apparatus according to claim 16, wherein the plurality of ONTs comprises sets of ONTs operative at different wavelength groups, and wherein the data comprises respective sets of data which are conveyed between the OLT and the respective sets of ONTs via the different wavelength groups.

19. Apparatus according to claim 16, wherein the data comprises sets of data which are conveyed via respective different channels, wherein each of the channels transfers data via a service coupled to the OLT and at least one of the ONTs.

20. Apparatus according to claim 19, wherein each of the channels is assigned a respective bandwidth, and wherein allocating the first and the second numbers of timeslots comprises allocating the first and the second numbers of timeslots responsive to the bandwidth of each of the channels.

21. Apparatus according to claim 20, wherein assigning each of the channels the respective bandwidth comprises changing the respective bandwidth to a different bandwidth responsive to a request received by the OLT.

22. Apparatus according to claim 16, wherein the OLT comprises a memory, and wherein the first and second numbers of timeslots are allocated responsive to respective first and second data parameters stored in the memory.

23. Apparatus according to claim 16, wherein a total of the first number and the second number of the timeslots is less than or equal to a bandwidth of each of the sequence of frames.

24. Apparatus according to claim 16, wherein the data comprises one or more further quantities of data for transmission to respective one or more further ONTs among the plurality of ONTs, such that the one or more further quantities are variable from each of the frames to the next in the sequence, wherein the OLT is adapted to allocate respective one or more further numbers of timeslots to be carried respectively to the one or more further ONTs.

25. Apparatus according to claim 16, wherein a period of each of the sequence of frames is substantially constant.

26. Apparatus according to claim 16, wherein each of the sequence of frames comprises a header comprising respective window parameters for each of the plurality of ONTs, each window parameter comprising a time and a size of a window of upstream data which each of the plurality of ONTs is permitted to transmit to the OLT.

27. Apparatus according to claim 26, wherein the respective window parameters are allocated by the OLT so that the windows do not collide at the OLT.

28. An apparatus according to claim 16, wherein the OLT is adapted to insert in each of the frames a frame header comprising first-ONT-parameters directed to the first ONT and second-ONT-parameters directed to the second ONT, wherein the first-ONT-parameters include values indicative of a first timing window during which the first ONT is able to transmit first ONT upstream data to a central OLT, and wherein the second-ONT-parameters include values indicative of a second timing window during which the second ONT is able to transmit second ONT upstream data to the central OLT, and wherein the first timing window does not overlap the second timing window.

29. An apparatus for downstream communication in a passive optic network by time division multiplexing of a sequence of frames, comprising:

a passive optical distribution fabric which is adapted to receive and convey data;

a plurality of receiving optical network terminations (ONTs) coupled to the optical distribution fabric comprising first and second ONTs which are adapted to receive the data from the optical distribution fabric; and a central optical line terminal (OLT) coupled to the optical distribution fabric which is adapted to receive the data for transmission into the optic network, the data comprising at least a first quantity of first data for transmission to the first ONT and a second quantity of second data for transmission to the second ONT, such that the first and second quantities are variable from each of the frames to the next in the sequence, to allocate in each of the frames a first number of timeslots to carry the first data to the first ONT and a second number of timeslots to carry the second data to the second ONT, such that the first and second numbers are variable from each of the frames to the next in the sequence responsive to variations in the first and second quantities of the data, and to transmit the data during the allocated timeslots, wherein the data comprises a third quantity of a third data for transmission to the first end point, such that the third quantity is variable from each of the frames to the next in the sequence, and wherein the OLT, responsive to the third quantity, is adapted to allocate in each of the frames a third number of timeslots to carry the third data to the first end point, such that a third number is variable from each of the frames to the next in the sequence, and such that a first and the third number of timeslots are not contiguous.

30. A method for communication between a transmission point of a network and an end point of the network by time division multiplexing of a sequence of frames, each of which is divided into multiple timeslots, the method comprising:

receiving at the transmission point data for transmission to the end point, the data comprising at least a first quantity of a first data for transmission to the end point and a second quantity of a second data for transmission to the end point, such that the first and second quantities are variable from each of the frames to the next in the sequence;

responsive to the first and second quantities, allocating in each of the frames a first number of the timeslots to carry the first data to the end point, and a second number of the timeslots to carry the second data to the end point, such that the first and second numbers are variable from each of the frames to the next in the sequence responsive to variations in the first and second quantities of the data;

inserting in each of the frames at least one first field and at least one second field, respectively, identifying the first and the second numbers of timeslots in each of the frames; and transmitting the data from the transmission point to the end point during the allocated timeslots.

31. A method according to claim 30, wherein the first data is conveyed via a first channel and the second data is conveyed via a second channel between the transmission point and the end point, wherein the first data is conveyed via a first service and the second data is conveyed via a second service, the first and second services being coupled to the transmission point and the end point and being external to the network.

32. A method for communication between a transmission point of a network and an end point of the network by time division multiplexing of a sequence of frames, each of which is divided into multiple timeslots, the method comprising:

receiving at the transmission point data for transmission to the end point, the data comprising at least a first quantity of a first data for transmission to the end point and a second quantity of a second data for transmission to the end point, such that the first and second quantities are variable from each of the frames to the next in the sequence;

responsive to the first and second quantities, allocating in each of the frames a first number of the timeslots to carry the first data to the end point, and a second number of the timeslots to carry the second data to the end point, such that the first and second numbers are variable from each of the frames to the next in the sequence responsive to variations in the first and second quantities of the data; and transmitting the data from the transmission point to the end point during the allocated timeslots, wherein the data comprises a third quantity of a third data for transmission to the end point, such that the third quantity is variable from each of the frames to the next in the sequence, and comprising, responsive to the third quantity, allocating in each of the frames a third number of timeslots to carry the third quantity to the end point, such that the third number is variable from each of the frames to the next in the sequence, and such that the first and third number of timeslots are not contiguous.

33. An apparatus for communication in a network by time division multiplexing of a sequence of frames, comprising:

a receiver coupled to the network which receives data from the network; and a transmitter coupled to the network which is adapted to receive the data for transmission into the network, the data comprising at least a first quantity of a first data for transmission to the receiver and a second quantity of a second data for transmission to the receiver, such that the first and second quantities are variable from each of the frames to the next in the sequence, to allocate in each of the frames a first number of timeslots to carry the first data to the receiver and a second number of timeslots to carry the second data to the receiver, such that a first and second numbers are variable from each of the frames to the next in the sequence responsive to variations in the first and second quantities of the data, to insert in each of the frames at least one first field and at least one second field respectively identifying the first and the second numbers of timeslots in each of the frames, and to transmit the data during the allocated timeslots.

34. Apparatus according to claim 33, wherein the first data is conveyed via a first channel and the second data is conveyed via a second channel between the transmitter and the receiver, wherein the first data is conveyed via a first service and the second data is conveyed via a second service, the first and second services being coupled to the transmitter and to the receiver, and being external to the network.

35. An apparatus for communication in a network by time division multiplexing of a sequence of frames, comprising:

a receiver coupled to the network which receives data from the network; and a transmitter coupled to the network which is adapted to receive the data for transmission into the network, the data comprising at least a first quantity of a first data for transmission to the receiver and a second quantity of a second data for transmission to the receiver, such that the first and second quantities are variable from each of the frames to the next in the sequence, to allocate in each of the frames a first number of timeslots to carry the first data to the receiver and a second number of timeslots to carry the second data to the receiver, such that the first and second numbers are variable from each of the frames to the next in the sequence responsive to variations in the first and second quantities of the data, and to transmit the data during the allocated timeslots, wherein the data comprises a third quantity of a third data for transmission to the receiver, such that the third quantity is variable from each of the frames to the next in the sequence, and comprising, responsive to the third quantity, allocating in each of the frames a third number of timeslots to carry the third quantity to the receiver, such that the third number is variable from each of the frames to the next in the sequence, and such that the first and third number of timeslots are not contiguous.

* * * * *